(12) United States Patent
Andre

(10) Patent No.: US 12,154,749 B2
(45) Date of Patent: Nov. 26, 2024

(54) TRAVELLING-WAVE TUBE

(71) Applicant: THALES, Courbevoie (FR)

(72) Inventor: Frédéric Andre, Vélizy-Villacoublay (FR)

(73) Assignee: THALES, Courbevoie (FR)

( * ) Notice: Subject to any disclaimer, the term of this patent is extended or adjusted under 35 U.S.C. 154(b) by 459 days.

(21) Appl. No.: 17/583,046

(22) Filed: Jan. 24, 2022

(65) Prior Publication Data

US 2022/0246381 A1    Aug. 4, 2022

(30) Foreign Application Priority Data

Jan. 28, 2021 (FR) ...................................... 2100782

(51) Int. Cl.
*H01J 23/12* (2006.01)
*H01J 23/027* (2006.01)
*H01J 25/34* (2006.01)
*H04B 7/185* (2006.01)

(52) U.S. Cl.
CPC ........... *H01J 23/12* (2013.01); *H01J 23/027* (2013.01); *H01J 25/34* (2013.01); *H04B 7/18513* (2013.01); *H04B 7/18515* (2013.01)

(58) Field of Classification Search
CPC .......... H01J 23/12; H01J 23/027; H01J 25/34; H01J 23/0275; H01J 25/42; H01J 23/30; H01J 2237/0206; H01J 37/34; H01J 37/321; H01J 37/32174; H01J 49/105; H01J 2237/24564; H01J 37/32935; H01J 37/3211; H04B 7/18513; H04B 7/18515; H04B 1/40; H01Q 13/206; H01Q 1/38; H01Q 1/3208; H01L 2924/19033; H01L 21/02002; H01L 21/02

See application file for complete search history.

(56) References Cited

U.S. PATENT DOCUMENTS

| | | | |
|---|---|---|---|
| 3,005,126 A | 10/1961 | Cutler | |
| 4,264,842 A | 4/1981 | Galuppi | |
| 7,893,878 B2 * | 2/2011 | Rofougaran | H01Q 23/00 343/793 |
| 8,624,494 B2 * | 1/2014 | Dayton, Jr. | H01J 25/34 330/43 |
| 2005/0067965 A1 * | 3/2005 | Nugues | H01J 23/027 315/5.38 |
| 2007/0163500 A1 * | 7/2007 | Kim | H01J 37/321 |

(Continued)

OTHER PUBLICATIONS

"Airbus presents active antenna for Eutelsat Quantum", Broadbandtv News, Nov. 22, 2019; https://www.broadbandtvnews.com/2019/11/22/airbus-presents-active-antenna-for-eutelsat-quantum/ downloaded on Aug. 10, 2022.

(Continued)

*Primary Examiner* — Lana N Le
(74) *Attorney, Agent, or Firm* — BakerHostetler

(57) ABSTRACT

A travelling-wave tube comprising a helix joined by posts to a vacuum chamber, each post made of electrically insulating material being covered by an electrically conductive material, of electrical conductivity comprised between 1000 and 100000 S·m−1, over a portion of the post extending from the end of the post joined to the helix to the end of the post joined to the vacuum chamber and corresponding to a height comprised between 10% and 50% of the post.

5 Claims, 3 Drawing Sheets

(56) References Cited

U.S. PATENT DOCUMENTS

2009/0190491 A1* 7/2009 Miller ................ H04B 7/18513
                                                                    455/13.1
2020/0196188 A1* 6/2020 Xenakis ............. H04B 7/18515

OTHER PUBLICATIONS

"Airbus presents ground-breaking technology for Eutelsat Quantum", Airbus, Nov. 21, 2019; https://www.airbus.com/en/newsroom/press-releases/2019-11-airbus-presents-ground-breaking-technology-for-eutelsat-quantum downloaded on Aug. 10, 2022.
Anonymous, "Struktur und Eigenschaften von pyrolytischem Kohlenstof", "Structure and properties of pyrolytic carbon", 2021. http://www.pyrocarbon.de/pageID_2388563.html.

* cited by examiner

2 — Vacuum enclosure
3 — Helix post
1 — Helix (+2 kV)
9 — Sheath = Collector 4 (ground)
5 — Collector 1 (-0.5 kV)
6 — Collector 2 (-1 kV)
7 — Collector 3 (-1.5 kV)
8 — Collector tip (-2 kV)

3 — Helix posts
1 — Helix
10 — Conductive deposit for attenuation
Ground
2 — Bare ceramic (high-voltage isolation)

| Potentials with respect to the electrical ground of the tube | Conventional TH3956 tube | TH3956 helix with biased collector |
|---|---|---|
| Cathode | -4 kV | -2 kV |
| Anode | 0 | 0 |
| Helix | 0 | +2 kV |
| Collector 1 | -2 kV | -0.5 kV |
| Collector 2 | -2.5 kV | -1.0 kV |
| Collector 3 | -3.3 kV | -1.5 kV |
| Collector 4 | N/A | 0 (body) |
| Collector tip | -4 kV | -2 kV |

TRAVELLING-WAVE TUBE

CROSS-REFERENCE TO RELATED APPLICATIONS

This application claims priority to foreign French patent application No. FR 2100782, filed on Jan. 28, 2021, the disclosure of which is incorporated by reference in its entirety.

FIELD OF THE INVENTION

The present invention relates to a travelling-wave tube.
The field of the invention is that of travelling-wave tubes, acronym TWT.

BACKGROUND

The most recent active antennas for geostationary satellites, or more generally for microwave telecommunication systems, are required to radiate the radiation generated by a high number (typically 150 to 200) of microwave sources the phases and amplitudes of which are controlled in order to form, via spatial recombination thereof, beams of given size and direction, while minimizing the generation of parasitic signals (both spatially and in frequency).

This new antenna architecture may use travelling-wave tubes as power amplifier. The Quantum from ADS (as especially disclosed at the following Internet addresses: https://www.airbus.com/newsroom/press-releases/en/2019/11/airbus-presents-groundbreaking-technology-for-eutelsat-quantum.html, https://www.esa.int/Applications/Telecommunications_Integrated_Applications/Quantum; and https://www.broadbandtvnews.com/2019/11/22/airbus-presents-active-antenna-for-eutelsat-quantum/) uses conventional travelling-wave tubes. These travelling-wave tubes are mounted on the panel of the satellite, with a minimum distance between the travelling-wave tubes of 80 mm because of the magnetic interference that they cause each other. HF power is transmitted to the phased-array via long lengths of waveguide. Two travelling-wave tubes are fed by the same electronic power conditioner (EPC) to decrease cost. These travelling-wave tubes with four collector stages have a very high electrical efficiency but a very large bulk and very high manufacturing cost.

Because of the minimum distance of 80 mm between the travelling-wave tubes, it is not possible to assemble them into a compact matrix array placed directly behind the radiating elements of the antenna. Therefore, the tubes must be located remotely far from the antenna. The waveguides that join the travelling-wave tubes to the antenna are long, this resulting in high microwave propagation losses (typically 1 to 2 dB) and extra weight.

SUMMARY OF THE INVENTION

One aim of the invention is to provide a travelling-wave tube that is suitable for this type of antenna and microwave telecommunication system in general, that is of far smaller size, so as to fit into the unit cell of the antenna, the dimensions of which are related to the physics of spatial recombination, there typically being 1 to 2.5 wavelengths between the sources at most (i.e. 35 mm in the Ku and Ka frequency bands), that has a satisfactorily high efficiency because assembling tubes into a very compact matrix array makes it difficult to cool them, and that is of limited complexity so as to greatly decrease production cost (typically by a factor of 2) with respect to a conventional travelling-wave tube, because of the high number of sources.

The invention relates to a travelling-wave tube that is optimized for a microwave telecommunication application and more particularly an active antenna, such as for a telecommunication satellite.

One aim of the invention is to overcome the abovementioned problems.

Thus, according to one aspect of the invention, a travelling-wave tube is provided that comprises a helix joined by posts to a vacuum chamber, each post made of electrically insulating material being covered by an electrically conductive material, of electrical conductivity comprised between 1000 and 100000 S·m−1, over a portion of the post extending from the end of the post joined to the helix to the end of the post joined to the vacuum chamber and corresponding to a height comprised between 10% and 50% of the post.

This conductive deposit is a microwave attenuator, the thickness of which gradually increases as a function of position along the axis of the helix, with, for example, a profile that may be Gaussian.

Such a travelling-wave tube allows the efficiency of a TWT to be improved at equal manufacturing cost, and allows a high number of tubes to be placed on the same EPC while allowing individual helix-voltage adjustment, which is economical. It also allows the operating voltages of the tube to be decreased by a factor of two, allowing more compact and less expensive gun and collector sub-assemblies to be used.

In one embodiment, said height corresponds to ⅓ of the post.

Such a value is an optimal compromise between attenuation effectiveness and high-voltage isolation distance. It corresponds to a helix distance at which the electromagnetic field is of the same order of magnitude as the field in proximity to the helix.

According to one embodiment, the conductive material is graphite or an RF absorber comprising graphite and silicon carbide or an RF absorber comprising silicon carbide.

The use of such conductive materials allows the length of the post covered with conductive material to be minimized.

In one embodiment, the travelling-wave tube comprises four collectors.

The higher the number of stages or collectors, the better the electrical efficiency, but the higher the cost and complexity of the resulting collector. The gain per stage also decreases with many stages. The choice of four stages or collectors is an excellent compromise for a travelling-wave tube.

According to one embodiment, the four collectors have as respective electrical potentials, with respect to ground, from closest to the helix to furthest from the helix, 0 kV, −0.5 kV, −1 kV, and −1.5 kV.

These obtained electrical voltages gradually increase, are dependent on the speed of the slowest and fastest electrons of the beam, and are chosen to maximize electrical efficiency while preventing a parasitic stream of uncollected electrons from returning to the delay line.

In one embodiment, the helix has as electrical potential 2 kV with respect to ground.

This is the opposite of the voltage of the collector, referenced 5 in FIG. 1, of the prior-art TWT of FIG. 1, in which the helix is not biased as in the present invention.

In one embodiment, the potential difference between the cathode and the helix is 4 kV.

The choice of this voltage is the best compromise between the ease with which the beam may be focused and microwave performance.

According to one embodiment, the travelling-wave tube comprises a collector tip at an electrical potential of −2 kV with respect to ground.

According to another aspect of the invention, an active antenna for a microwave telecommunication system comprising at least 50 amplitude- and phase-controlled microwave sources is provided, wherein a set of one or two sources comprises a travelling-wave tube such as described above to amplify its power, and a DC block in coplanar line technology on an alumina wafer.

According to another aspect of the invention, a geostationary satellite comprising at least one active antenna such as described above is also provided.

BRIEF DESCRIPTION OF THE DRAWINGS

The invention will be better understood on studying a few embodiments described by way of completely non-limiting example and illustrated by the appended drawings, in which.

Throughout the figures, elements having identical references are similar.

DETAILED DESCRIPTION

In the present description, the embodiments that are described are in no way limiting, and features and functions that are well known to those skilled in the art are not described in detail.

Figure 1:
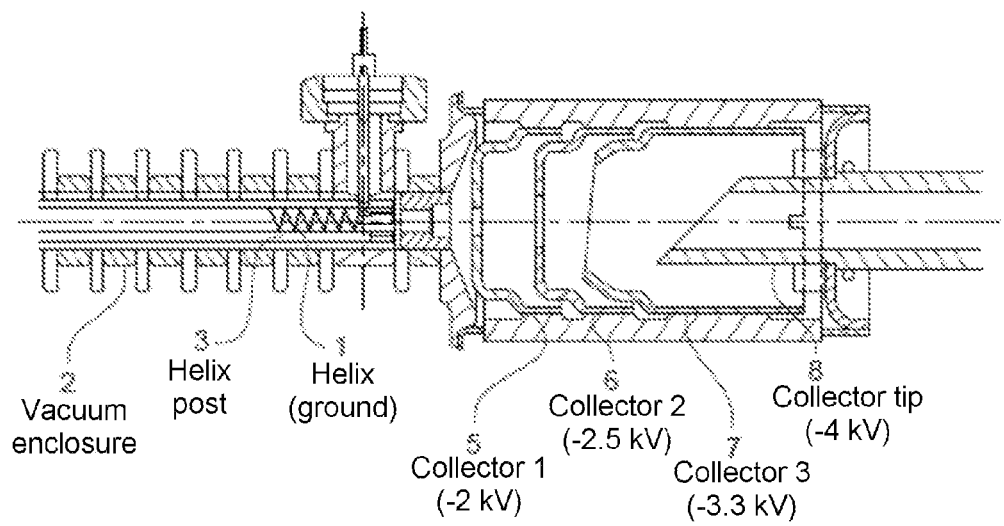
FIG. 1 schematically illustrates a longitudinal cross-sectional view of a travelling-wave tube, according to the prior art.
Figure 2:
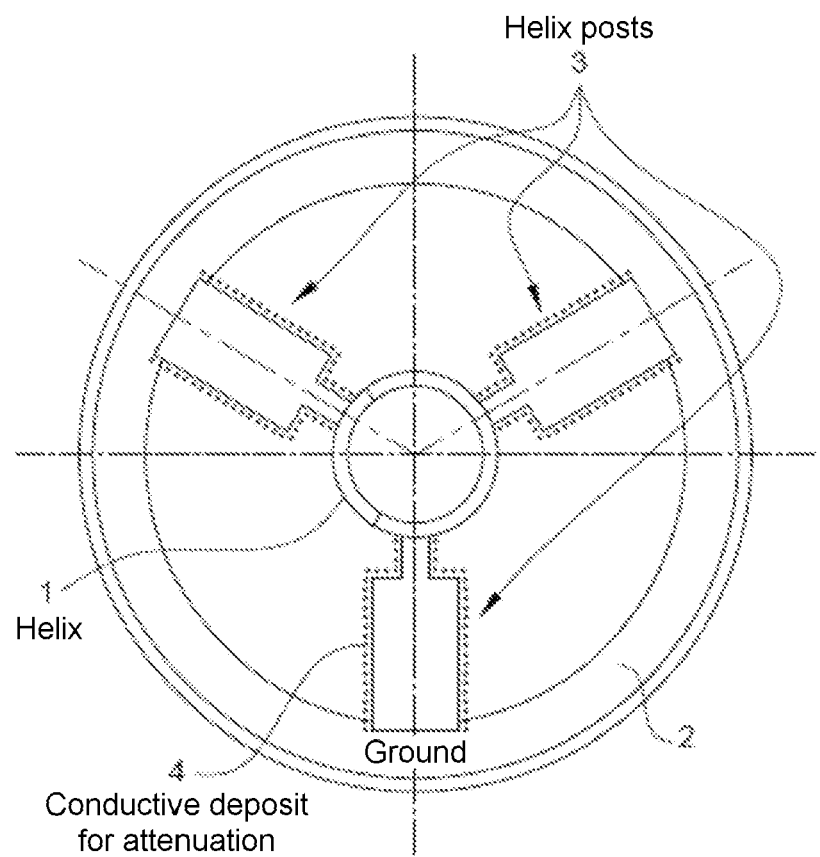
FIG. 2 schematically illustrates a transverse cross-sectional view of a travelling-wave tube, according to the prior art.

FIG. 1 illustrates a longitudinal cross-sectional view of a prior-art travelling-wave tube, and FIG. 2 illustrates a transverse cross-sectional view of the travelling-wave tube of FIG. 1.

In a conventional travelling-wave tube, a helix 1 is isolated from electrical ground, i.e. from a vacuum chamber 2, by posts 3 for microwave reasons. Inside the travelling-wave tube, in the vacuum chamber 2, only deposits of a conductive layer 4, for attenuating the RF waves, on the posts 3 of the helix 1, connect the helix 1 to ground. These attenuating or attenuator layers or deposits 4 are formed by a deposit of graphite, or absorber of the HF waves, that is deposited locally on the posts of the helix 1.

Such a conventional travelling-wave tube generally comprises a first collector 5 at an electrical potential of −2 kV with respect to ground, a second collector 6 at an electrical potential of −2.5 kV with respect to ground, a third collector 7 at an electrical potential of −3.3 kV with respect to ground, and a collector tip at an electrical potential of −4 kV with respect to ground.

Figure 3:
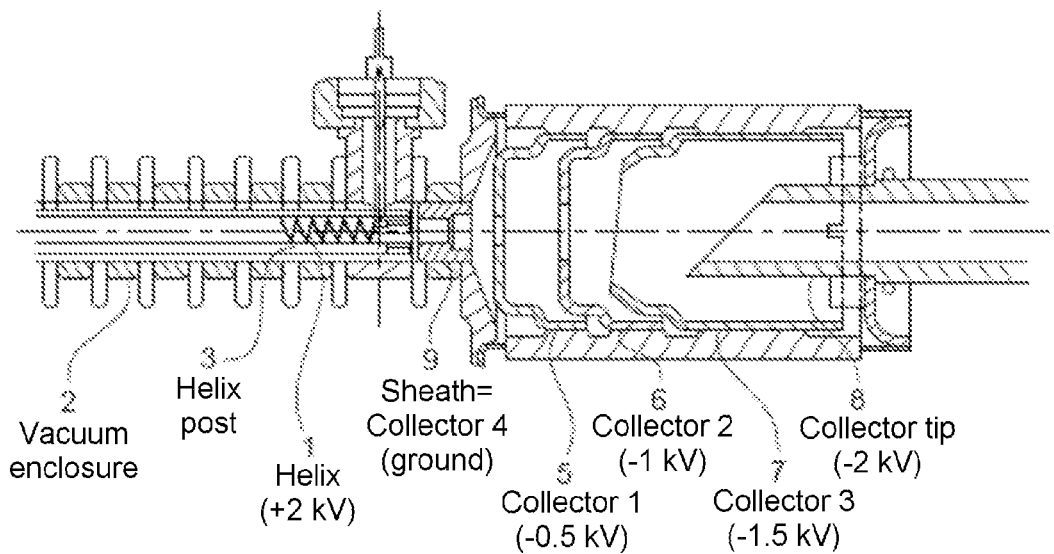
FIG. 3 schematically illustrates a longitudinal cross-sectional view of a travelling-wave tube, according to one aspect of the invention.
Figure 4:
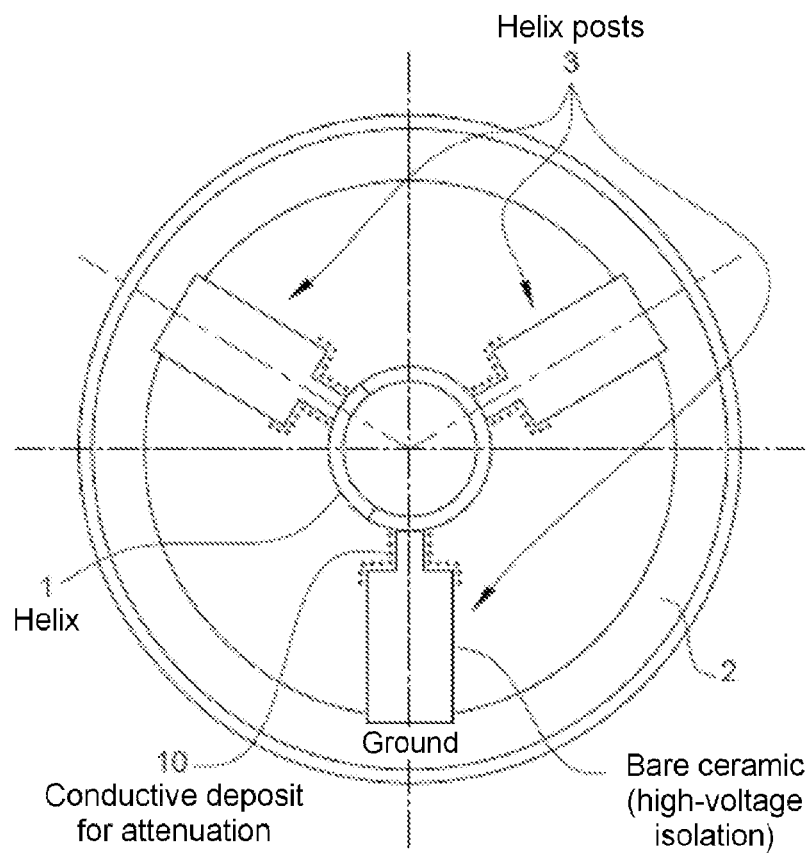
FIG. 4 schematically illustrates a transverse cross-sectional view of a travelling-wave tube, according to one aspect of the invention.

FIG. 3 illustrates a longitudinal cross-sectional view of a prior-art travelling-wave tube, and FIG. 4 illustrates a transverse cross-sectional view of the travelling-wave tube of FIG. 3.

The present invention adds a fourth collector 9, in the present case the sheath of the travelling-wave tube, this greatly increasing electrical efficiency.

Furthermore, each post 3, of the helix 1, made of electrically insulating material is covered by an electrically conductive material, of electrical conductivity comprised between 1000 and 100000 S·m−1, over a portion of the post extending from the end of the post 3 joined to the helix 1 to the end of the post 3 joined to the vacuum chamber and corresponding to a height comprised between 10% and 50% of the post 3, and preferably to ⅓ of the post.

The conductive material may be graphite or an RF absorber comprising graphite and silicon carbide or an RF absorber comprising silicon carbide.

The travelling-wave tube comprises four collectors 9, 5, 6, 7, which have as respective electrical potentials, with respect to ground, from closest to the helix 1 to furthest from the helix 1, 0 kV, −0.5 kV, −1 kV, and −1.5 kV.

The electrical potential of the helix 1 is 2 kV. The travelling-wave tube comprises a collector tip at an electrical potential of −2 kV.

Thus, the present invention allows a travelling-wave tube that divides the conventional operating voltage by a factor of about two to be obtained, this making it possible to use gun and collector sub-assemblies that are less expensive, less voluminous and less heavy because dimensioned for a lower voltage.

Such a travelling-wave tube allows the helix voltages of the tubes to be adjusted individually, this allowing more than two tubes to be mounted on the same EPC without decreasing performance.

Such a travelling-wave tube also allows a high-voltage electrical connector of small size to be used to feed the tube (terminating a high-voltage cable).

The invention allows the helix 1 to be biased to a potential higher than ground (about half the potential VK to which the cathode of a conventional travelling-wave tube is biased). The voltages in all of the collectors 5, 6, 7, 9 and the electron gun are thus decreased by a factor of about 2.

In addition, since the body (or sheath) of the travelling-wave tube is at a potential lower than that of the helix 1, it acts as a depressed collector 9 placed upstream of the three other collectors 5, 6, 7. This adds a depression stage for an unchanged number of electrodes in the collector assembly. Electrical efficiency is therefore increased without increasing the cost of the tube and at equal bulk.

The EPC used must deliver an additional electrical voltage to bias the helix 1. However, the helix 1 intercepts a very low current, of the order of one milliamp, this simplifying this supply of power. The EPC may then deliver as many individual electrical voltages as there are travelling-wave tubes connected thereto, this allowing individual adjustment of the electrical voltage of each helix 1 that would not be viable for a conventional travelling-wave tube.

In a conventional travelling-wave tube, the helix 1 is isolated from electrical ground by its posts 3 for microwave reasons. Inside the tube (in the vacuum chamber 2), only the attenuators connect the helix to ground. These attenuators are formed from a deposit or layer of graphite, which absorbs high-frequency layers, and which is deposited locally on the posts 3 of the helix 1.

In the present invention, an electrically conductive material 10, of electrical conductivity comprised between 1000 and 100000 S·m−1, is deposited over only a portion of the post 3 extending from the end of the post joined to the helix 1 to the end of the post joined to the vacuum chamber 2 and corresponding to a height comprised between 10% and 50% of the post 3, and preferably to a height corresponding to ⅓ of the post.

In the example shown in FIG. 4, the posts 3 of the helix 1 narrow in proximity to the helix 1.

This material 10, such as graphite, is deposited solely on the portion of the posts 3 in proximity to the helix, where the microwave frequency wave is present, this guaranteeing that it is able to perform its function of dissipating the wave. The rest of the posts 3 is devoid of graphite, this allowing electrical isolation over a height of about 1 mm. This isolation distance is sufficient to isolate at least 2 to 3 kV. Outside the tube, the transition between the coaxial output and the waveguide allows electrical isolation to be achieved by virtue of a conventional "radiating antenna" type transition.

Figures 5, 6:
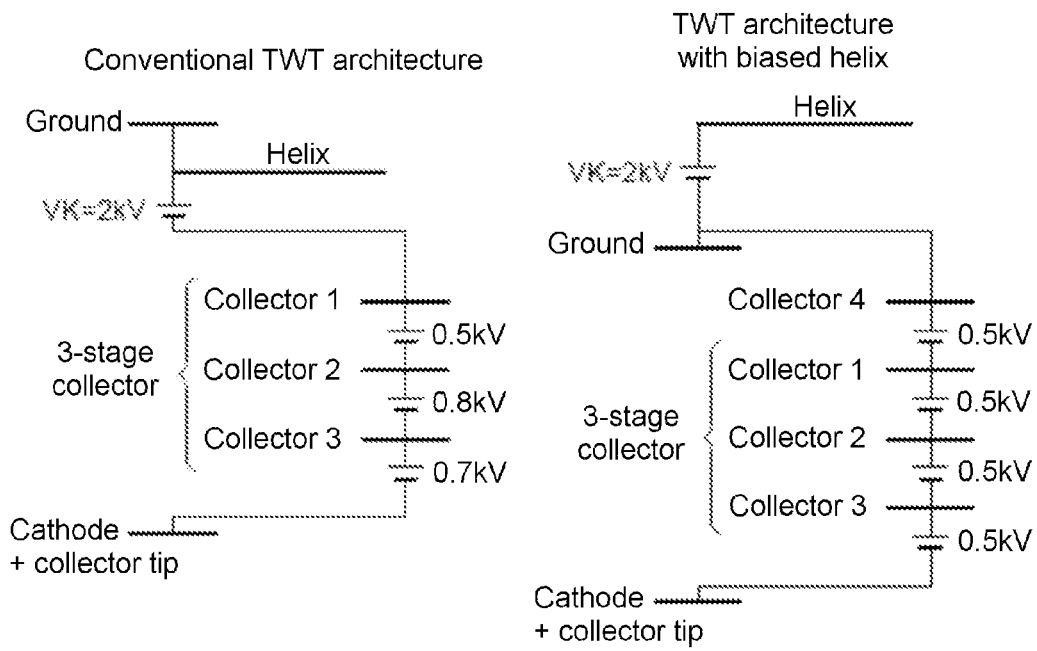
FIG. 5 schematically illustrates potentials with respect to electrical ground of the tube at various points of various elements of the travelling-wave tube, according to one aspect of the invention.
FIG. 6 schematically illustrates a comparison of the architecture of a prior-art travelling-wave tube and of the architecture of a travelling-wave tube according to one aspect of the invention.

FIG. 5 shows a comparative table of electrical voltages allowing comparison between a prior-art travelling-wave tube and a travelling-wave tube according to one aspect of the invention.

FIG. 6 shows a comparison of the architecture of a prior-art travelling-wave tube and of the architecture of a travelling-wave tube according to one aspect of the invention.

An antenna for a microwave telecommunication system, such as a geostationary satellite, comprising at least 50 amplitude- and phase-controlled microwave sources is provided, wherein a set of one or two sources comprises a travelling-wave tube such as described above to amplify its power, and a DC block in coplanar line technology on an alumina wafer.

Such a DC block allows the RF signal to be delivered to the helix while guaranteeing the electrical isolation that allows the helix to be biased to a high voltage. It is necessary because the user equipment is at electrical ground.

The DC block allows the RF signal to be propagated from the user access (for example an SMA connector) to the helix, the user access to be grounded, and the helix to be biased to a high voltage.

This type of DC block may be produced in coplanar line technology on an alumina wafer.

The invention claimed is:

1. A travelling-wave tube comprising:
a helix joined by posts to a vacuum chamber, each post made of electrically insulating material being covered by an electrically conductive material, of electrical conductivity comprised between 1000 and 100000 S·m−1, only over a portion of the post extending from the end of the post joined to the helix to the end of the post joined to the vacuum chamber and corresponding to a height comprised between 10% and 50% of the post, wherein the helix has as electrical potential 2 kV with respect to ground, wherein the potential difference between the cathode and the helix is 4 kV;
four collectors, wherein the four collectors have as respective electrical potentials, with respect to ground, from closest to the helix to furthest from the helix, 0 kV, −0.5 kV, −1 kV, and −1.5 kV; and
a collector tip at an electrical potential of −2 kV with respect to ground.

2. The travelling-wave tube according to claim 1, wherein said height corresponds to ⅓ of the post.

3. The travelling-wave tube according to claim 1, wherein the conductive material is graphite or an RF absorber comprising graphite and silicon carbide or an RF absorber comprising silicon carbide.

4. An active antenna for a microwave telecommunication system comprising at least 50 amplitude- and phase-controlled microwave sources, wherein a set of one or two sources comprises a travelling-wave tube according to claim 1 to amplify its power, and a DC block in coplanar line technology on an alumina wafer.

5. A geostationary satellite comprising at least one active antenna according to claim 4.

* * * * *